UNITED STATES PATENT OFFICE.

MOSES K. GLINES, OF NEW YORK, N. Y., ASSIGNOR TO GEORGE E. GLINES, OF SAME PLACE.

IMPROVEMENT IN COMPOSITIONS FOR ROOFS.

Specification forming part of Letters Patent No. 151,584, dated June 2, 1874; application filed May 6, 1874.

*To all whom it may concern:*

Be it known that I, MOSES K. GLINES, of the city, county, and State of New York, have invented a new Fire-Proof Covering for Roofs, and other purposes, of which the following is a specification:

My new material for covering roofs consists of the following ingredients: Silica, alumina, peroxide of iron, slate, lime, and manganese, to be all pulverized, intimately mixed, and then formed into a plastic or semi-fluid mass, so that it will be susceptible of being applied by the addition of some suitable oleaginous or viscid material to the surface of wood and other substances, and of becoming adherent thereto.

I use the above-named solid ingredients in substantially the following proportions: I take of silica, sixty and a half pounds; alumina, twenty-one and three-fourths pounds; peroxide of iron, fifteen and a half pounds; and of lime and manganese, each, fourteen and a half ounces. These substances, whether procured separately or combined in a natural substance, I grind to a fine flour, and mix intimately together. Then with each pound of the mass I mingle two pounds of slate, also ground finely, all to be well mixed. I then add and grind into this compound a proper quantity of some suitable oil, preferably rosin oil, and would recommend also the addition of naphtha-varnish and japan-varnish, for the purpose of facilitating the hardening and drying of the composition when applied to surfaces; and when these three fluid substances are used, they should be used in the following proportions: To each pound of the above powdered solid materials, use half a pint of oil, one-sixth of a pint of naphtha-varnish, and one-fifteenth of a gill of japan-varnish. Coloring matter may be added as desired. One pound of venetian-red and one-quarter of a pound of lamp-black will be found to impart a good color.

A composition made of the solid ingredients specified, treated and mixed with a suitable oil, as described, is a thick fluid, which, when spread upon a roof or other surface and dried, is incombustible, not affected by heat, and is impervious to moisture. It is very adherent to the surface to which it is applied, and is not liable to crack or break, as it is flexible, and, being somewhat elastic, it will expand and contract with the surface to which it adheres.

I claim as my invention—

The composition of matter herein described, consisting of the said solid ingredients named, mixed with an oleaginous or viscid material, so as to form a mass that may be spread upon a roof or other surface, and become adherent thereto, as specified.

MOSES K. GLINES.

Witnesses:
   BENJ. S. CLARK,
   J. S. MACKENZIE.